May 14, 1946. D. W. ABERNATHY Re. 22,754

THERMOSTATIC ELEMENT

Original Filed June 9, 1942

Inventor
David W. Abernathy
BY
Maurice S. Cayp
Attorney.

Reissued May 14, 1946

Re. 22,754

UNITED STATES PATENT OFFICE 22,754

THERMOSTATIC ELEMENT

David W. Abernathy, Chicago, Ill., assignor to Products Development, Inc., Chicago, Ill., a corporation of Illinois Original No. 2,349,126, dated May 16, 1944, Serial No. 446,332, June 9, 1942. Application for reissue May 2, 1945, Serial No. 591,452

11 Claims. (Cl. 200—138)

This invention relates generally to thermostatic electrical switches and more particularly to a novel and improved switch of this kind especially adapted to be used in connection with the heater employed in heating wound tresses of hair as for the permanent waving thereof.

The primary object of the invention is to provide a novel and improved thermostatic electrical switch structure.

A further object of the invention is to provide a novel bimetal type of thermostatic switch which is simple and compact and in which the bimetal member is not subject to undue stress at low temperatures.

Another object is to provide an improved thermostatic switch having a novel mounting for the heat responsive and movable contact structure thereof.

A further object of the invention is to provide a novel and improved thermostatic switch which will respond accurately to high temperatures for which it has been adjusted.

A further object of the invention is to provide a novel thermostatic switch unit which may be easily associated with the shell of a heater clamp so that the switch is immediately responsive to the heat.

Other objects and inventions lie in the specific constructional details of the thermostatic switch.

With the foregoing and other objects in view which will appear as the description proceeds, the invention consists of certain novel features of construction, arrangement and combination of parts hereinafter fully described, illustrated in the accompanying drawing, and particularly pointed out in the appended claims, it being understood that various changes in the form, proportion, size and minor details of the structure may be made without departing from the spirit or sacrificing any of the advantages of the invention.

For the purpose of facilitating an understanding of my invention, I have illustrated in the accompanying drawing a preferred embodiment thereof, from an inspection of which, when considered in connection with the following description, my invention, its mode of construction, assembly and operation, and many of its advantages should be readily understood and appreciated.

Referring to the drawing in which the same characters of reference are employed to indicate corresponding or similar parts throughout the several figures of the drawing.

In the permanent waving of hair by means of electrical heaters, it has been customary to control the energizing electrical circuit thermostatically for the purpose of maintaining the temperature of the heaters substantially constant. This is desirable for reasons of control and unifromity in the waving process. In the manufacture of the heating clamps the thermostatic element is associated with each respective clamp and is adjusted to open the circuit to the heating elements when a certain predetermined temperature is attained at the clamp jaws. The types of thermostatic controls heretofore used have been constructed in such fashion that the bimetallic elements thereof, sometimes referred to as the bimetals, have been subject to undue stress during the early life of the units and as a result their characteristics have tended to undergo distortional changes from those contemplated. Hence it has been necessary to replace the thermostats or readjust them often, or in some other manner compensate for the change in characteristics. Either excess heat or fluttering may result from misadjusted thermostatic elements.

Probably the greatest cause for distortional strain occuring is that reverse stress is placed upon the bimetal when it is subject to low temperatures, as for example, when transported in cold weather or stored in an unheated warehouse. Even if the thermostatic element is merely subject to ordinary temperatures different from those under which it will operate, and maintained that way for a long while, its characteristics may change perceptibly due to the stress and strains which inevitably develop under such conditions.

My new invention besides eliminating the disadvantages above described, provides a thermostatic switch which is so small and compact that instead of being associated with the heater clamps in the manner heretofore customary, it may be associated with the jaws of the respective clamps at a point immediately adjacent to the heating element and hence may more accurately respond to the proper temperature and not depend for operational heat upon that portion of the heat from the element which is conducted to it along the shell as has been the case with prior elements.

Figure 1:
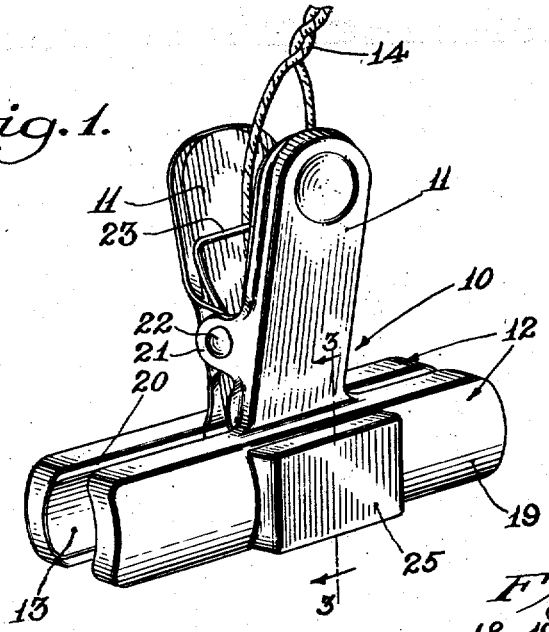
Fig. 1 is a perspective view of a heater clamp such as used in heating wound tresses of hair in the permanent waving thereof, having my invention incorporated therein.
Figure 3:
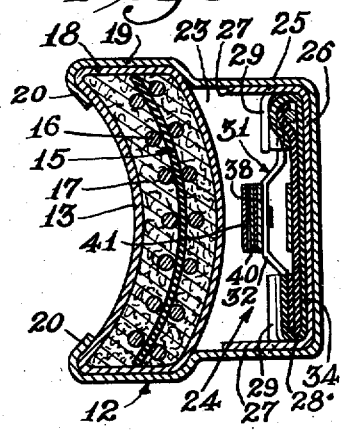
Fig. 3 is a sectional view taken through one of the clamp jaws substantially along the line 3—3 of Fig. 1.
Figure 2:
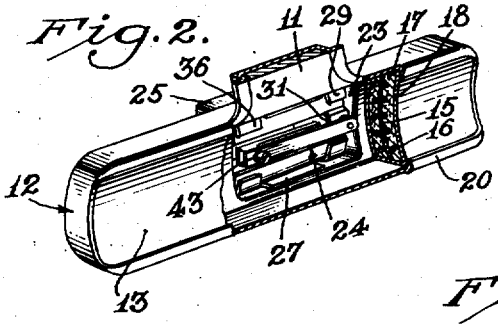
Fig. 2 is a perspective view of one of the jaws of the clamp broken away in order to show the inner construction thereof.

Referring now to the specific details of a device embodying the invention, the reference character 10 designates generally a clamp of the type used in giving the so-called "machine" permanent wave. The clamp 10 comprises a pair of clamp arms 11 terminating in elongated transverse jaws 12 which have the inner surfaces 13 thereof concave and opposed in order to hold and heat therebetween a tress of hair which has been suitably wound or formed to some desired configuration. Electrical wires 14 supply current to a heating element which has been generally shown as a mica member 15 (Figs. 2 and 3) wound with resistance wire 16, embedded in a ceramic material or the like 17 and the whole being retained by a covering member 18. The outer portion of each of the jaws 12 comprises a metal shell 19 which may have its edges engaged over the covering member 18 as shown at 20.

That portion of the clamp 10 above-described is generally well known and per se is not part of my invention. However, it is of importance here as it demonstrates an important environment in which my invention is particularly useful.

The shell 19 is preferably fashioned from sheet metal and may be integrally formed with the arms 11. Such arms 11 are provided with ears 21 which cooperate with a pin 22 extending therethrough so that the arms 11 may pivot with respect to one another. A wire spring 22ª normally urges the clamp jaws 12 into engagement with one another.

Integrally formed with the shell 19, I have provided a cavity 23 which is on the outer side of one of the jaws 12. The shell being formed of sheet metal, the cavity 23 is struck therein at the time of the drawing or forming of said shell. Within this cavity 23, I have affixed my thermostatic switch element 24. Of course, the cavity appears from the outside of the clamp member 12 as a somewhat rectilinear protuberance 25 upon the outer surface of the shell 19. The thermostat is thus seen to be almost immediately next to the heating element contained in the covering member 18. Hence heat from the element will impinge directly upon the thermostat switch 24 and cause same to operate in the desired manner.

The thermostatic switch 24 comprises an elongated substantially rectilinear base member 26 adapted to fit snugly into the cavity 23. The base member has upwardly extending flanges 27 along portions of its longer edges which are adapted to engage the inner walls of the cavity 23. The base member 26 is lined with a layer of fiber insulating paper 28. At one end, the base member 26 has a pair of integrally formed lugs 29 which engage the ends 30 of a small strip 31 of resilient metal such as phosphor bronze, which strip is laid across the end of the base member 26. The central portion of the strip 31 is bent upwardly as shown at 32 and an upwardly projecting electrical contact point 33 is provided thereon. Obviously, the mounting of the contact point 33 is more or less resilient although for all practical purposes this contact point is considered as a fixed contact. It will be noted that for heat insulation I have provided a layer of asbestos paper 34 between the fiber paper layer 28 and the ends 30 of the strip 31.

The opposite end of the base member 26 is provided with a second strip 35 of resilient metal such as phosphor bronze engaged beneath bent over lugs 36 and insulated by said layer of fiber paper 28 and the asbestos paper 34. This strip 35 is flat and is provided with an arm portion 37 extending longitudinally along the base 26 toward but substantially short of the contact support 31 and then is bent back upon itself in substantially U-shaped form as at 38 to provide a flat leaf spring arm which terminates at 39 overlying the portion of the strip anchored by the lugs 36.

At the termination point 39, I have welded the superimposed end portions of a juxtaposed bimetal member 40 and a coextensive but somewhat longer strip of resilient metal 41 which projects freely beyond the spring mount 35 and is provided on the free end thereof with a downwardly extending contact point 42 normally adapted to engage with the contact point 33. As will be noted, the bimetal member 40 and the movable contact carrier 41 project cantilever fashion longitudinally over and beyond the spring leg 38 toward the fixed contact support 31. The contiguous ends of all three members 39, 40 and 41 are so intimately joined together by the welding that they form a solid block 39′ which moves as a unit when the supporting spring arm portion 38 of the mounting strip is flexed. The block 39′ is tapped for the reception of an adjusting screw 43, the tip of which is adapted to project below the block and contact the underlying surface of the strip 35 freely and slidably.

Figure 5:
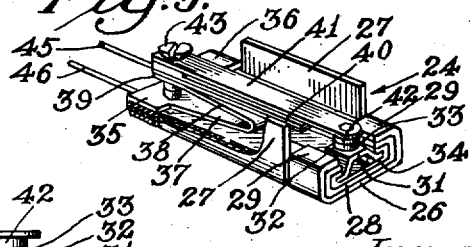
Fig. 5 is a perspective view of the switch unit prior to being installed in the shell of the clamp jaw, and having certain parts broken away and in section for clarity of illustration.
Figure 4:
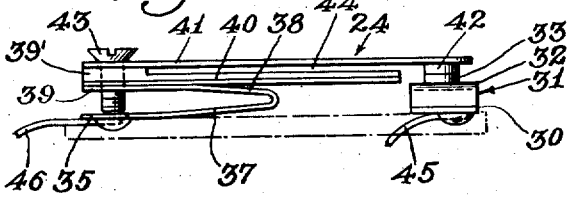
Fig. 4 is a side elevational view of my thermostatic switch.

Good results in adjustment have been secured by having the arms 37 and 38 of the contact-supporting member 35 so biased that they tend to close upon one another with the integral joint between the arms serving more or less as a pivot enabling the arms to be swung open and closed. Thus, screwing the adjusting screw down causes the arms to separate as seen in Figs. 4 and 5 and tips the free or contact-carrying end of the strip 41 toward and into variable-pressure engagement with the fixed contact 33. As the mount leg 38 is flexed away from the underlying leg 37 beyond a certain point, the tension of the carrier strip 41 is increased due to the engagement of its contact end with the fixed contact 33, and the active or free end of the bimetal strip 40 is depressed to carry it proportionately away from the carrier strip to increase the space through which it must travel before acting on the carrier strip. In this way the temperature at which the switch will act can be selectively increased. By unscrewing the adjusting screw 43, the arms 37 and 38 are allowed to approach one another and thus relieve the pressure with which the contact-carrying strip 41 approaches the fixed contact 33 and decrease the spacing between the bimetal and carrier strips, thus reducing the temperature at which the switch will act. In this manner, the switch can be adjusted fairly accurately for operation at any predetermined temperature within a substantial range. More importantly, substantial manufacturing variations in the various parts of the assembly can be tolerated conveniently because adjustment of the switch to operate at any predetermined temperature within said range can be effected with ease and accuracy.

It will be noted that at its welded terminus the bimetal member 40 is somewhat thicker than the remainder of its body, or, obviously, a spacer may be interposed to afford such thickness, and hence there is a spacing 44 provided between the upper face of the bimetal member 40 and the carrier strip 41, affording ample clearance to permit some heat-induced flexure of the bimetal member such as may be caused by ordinary warm weather, without the bimetal engaging against the adjacent face of the carrier strip 41. Because of this freedom of self-adjustment in response to non-operating heat, there is obviously no stress generated in the bimetal which would cause it to become permanently strained.

As for the reaction of the bimetal 40, when it is subject to low temperatures, that is also permitted in order that there be no reverse stress placed thereupon. It will be noted that the bimetal 40 is substantially "floating," that is to say, if it should tend to curl downwardly there is nothing to impede its movement. Considerable space may be provided to accommodate it in even subzero temperatures. The bimetal thus retains its resilience throughout various temperature changes so that in use it will respond to the exact temperature for which it has been adjusted. At that temperature the bimetal 40 moves upwardly, as viewed in Fig. 4, engages against the bottom face of the contact-carrying strip 41 and flexes the latter up to lift the contact 42 from the contact 33. Inasmuch as there has been no distorting strain placed upon the bimetal, its resilience remains unimpaired so that while it releases upon cooling to enable reversing movement of the strip 41, return of the latter to contact-closing position will be gradual, eliminating flutter.

In prior thermostatic switches, the bimetal has usually been in some manner connected with the movable contact-carrying member or has itself been such member so that where the bimetal is subjected to low temperatures it is considerably stressed since its motion is opposed by the fixed contact. This may result in a permanent strain or distortion as suggested above. As to the reverse reaction of the element in warm weather, where the bimetal is associated with the contact directly, a certain amount of the tension between the contacts is relieved, making for uncertain break temperatures.

The supporting strips 31 and 35 are provided with wire leads 45 and 46, respectively, whereby the switch 24 may be connected into the circuit of the electrical heater element in a well known manner.

In view of the above description it should be apparent that I have provided a novel and ingenious thermostatic switch which is not only efficient and positive in operation, but which is compact and well arranged so that it may be incorporated into a small space such as the cavity 23 of the clamp as described herein.

It is believed that my invention, its mode of construction and assembly, and many of its advantages should be readily understood from the foregoing without further description, and it should also be manifest that while a preferred embodiment of the invention has been shown and described for illustrative purposes, the structural details are nevertheless capable of wide variation within the purview of my invention as defined in the appended claims.

What I claim and desire to secure by Letters Patent of the United States is:

1. A thermostatic switch adapted to open an electrical circuit at a predetermined temperature, comprising a base member, a resilient fixed contact-supporting member attached to said base at one end thereof and having a contact provided thereon, resilient movable contact supporting means attached to the base member at the opposite end thereof and comprising a strip bent upon itself to form a substantially U-shaped spring, one end thereof being fixed to the base member, a bimetal strip and a resilient contact-carrying strip having a contact on the free end thereof for engagement with said fixed contact, the other end of said contact-carrying strip and one end of said bimetal strip being connected to the second end of said spring, whereby said spring may control the pressure between the contacts.

2. A thermostatic switch as defined in claim 1 wherein the free end of said bimetal strip is adapted to engage with a side of said resilient strip for causing disengagement between said contacts when the bimetal member is subject to said predetermined temperature.

3. A thermostatic switch as defined in claim 1 wherein the free end of said bimetal strip is adapted to engage with a side of said resilient strip for causing disengagement between said contacts when the bimetal member is subject to said predetermined temperature, but is normally spaced from said resilient strip and free to bend away from said strip when the temperature is low.

4. A thermostatic switch adapted to open an electrical circuit at a predetermined temperature, comprising a base member, a fixed contact, mounted at one end of said base, resilient movable contact supporting means attached to the base member at the opposite end thereof and comprising a strip bent upon itself to form a substantially U-shaped spring, one end thereof being fixed to the base member, a bimetal strip and a resilient contact-carrying strip having a contact on the free end thereof for engagement with said fixed contact, one end of said bimetal strip and the other end of said contact-carrying strip being connected to the second end of said spring, whereby said spring may control the pressure between the contacts.

5. In combination in a thermostatic electrical switch of the character described, a pair of contacts, one of said contacts being movable relative to the other and having an elongated flexible carrier strip, a bimetal strip, a mount having a movable portion thereof in support of both said carrier strip and said bimetal strip in substantially coextensive superimposed relation with the bimetal strip in juxtaposition to said mount portion and the contact end portion of the carrier strip projecting beyond the adjacent end of the bimetal strip, and means for adjusting the position of said movable mount portion to alter the tension of said carrier strip with respect to said contacts and to vary the spacing of the active end of the bimetal strip from the carrier strip so as to predetermine the force with which the bimetal strip must act and the distance its active end must travel to flex the carrier strip and separate the contacts, and thus the temperature at which the switch will act.

6. In combination in a thermostatic electrical switch of the character described, a relatively fixed contact, a flexible strip having a contact separably engageable with the fixed contact to close an electrical circuit therethrough, a bimetal strip, and a movable mount supporting said bimetal strip and the contact-carrying strip, said mount being adjustable to vary the flexure of the carrying strip in its closed-contact position without stress upon the bimetal strip whereby to predetermine the force with which the bimetal strip must act upon the contact-carrying strip to flex it into movement relative to the fixed contact and thereby the temperature at which the switch becomes active.

7. In combination in an electrical switch of the character described, a relatively fixed contact, an elongated resilient carrying strip having a contact thereon movably engageable with said fixed contact and adapted to act under tension in maintaining the contacts pressed together, a substantially U-shaped spring mount having said carrying strip secured to one arm thereof and having the other arm mounted in fixed position, the arms of said spring mount being biased normally to collapse together and relieve the contact-pressing tension of said carrying strip, an adjusting screw threaded through the strip-carrying leg of said mount and engaging at its tip against the opposing face of the opposite leg adapted when screwed down to separate said legs and selectively adjust the contact-pressing tension and flexure of said contact-carrying strip, and a bimetal strip carried by said spring mount to act upon the carrying strip to move it relative to the fixed contact.

8. In combination in a thermostatic switch unit, an elongated base of small size having sides adapted to fit snugly against the inner sides of a housing therefor, a fixed contact mounted adjacent one end of the base inside of the planes of said sides, a movable contact cooperating electrically with said fixed contact and having a carrier strip extending therefrom within the planes of said sides to adjacent the opposite end of the base, a mount for said strip at said opposite end of the base supporting the strip cantilever fashion, and a bimetal strip also supported cantilever fashion by the strip mount and in coextensive spaced relation to the carrier strip but extending short of said fixed contact to flex freely under the influence of temperature changes, said bimetal strip being engageable with said carrier strip in response to certain temperature conditions to move the contact end thereof relative to the fixed contact.

9. A switch unit as defined in claim 8 in which the sides of the base are extended as flanges projecting protectively beyond the plane of the contact-carrying strip whereby the unit can be handled safely.

10. In combination, in an electrical switch of the character described, a relatively fixed contact, an elongated resilient carrying strip having contact thereon movably engageable with said fixed contact and adapted to act under tension in maintaining the contacts pressed together, a substantially U-shaped spring mount having said carrying strip secured to one arm thereof and having the other arm mounted in fixed position, the arms of said spring mount being biased normally to collapse together and relieve the contact-pressing tension of said carrying strip, an adjusting screw threaded through the strip-carrying leg of said mount and engaging at its tip against the opposing face of the opposite leg adapted when screwed down to separate said legs and selectively adjust the contact-pressing tension and flexure of said contact-carrying strip, and a bimetal element mounted on the strip-supporting leg of the mount in an adjustably spaced relationship to the strip and adapted to respond to predetermined temperature in any adjusted relationship to flex the contact-carrying strip for opening the contacts.

11. In combination in a switch unit, an elongated base, a fixed contact mount insulatedly secured adjacent to one end of said base, a movable contact mount insulatedly secured adjacent to the opposite end of said base and including a movable arm, a flexible contact strip mounted on said movable arm and extending into overlapping relation to said fixed contact mount, said fixed contact mount and said strip having respective relatively separable contact points thereon, said movable arm being formed with a resilient support portion normally exerting tension on said strip in a direction away from said fixed contact whereby said strip is held in relatively untensioned relation to said fixed contact, and means associated with said arm and movable in a direction tending to oppose the tension on the strip whereby said arm is moved into relatively adjusted strip-tensioning position to effect selectively variable pressing together of the contacts, and a bimetal element mounted in assembly with and between the contact-carrying strip and the movable mounting arm, with the bimetal element in free-floating relation to the strip and movable with said arm.

DAVID W. ABERNATHY.